Aug. 26, 1969     D. B. PRESCOTT     3,463,272
SMALL VEHICLE LIFT
Filed Nov. 9, 1967     3 Sheets-Sheet 1
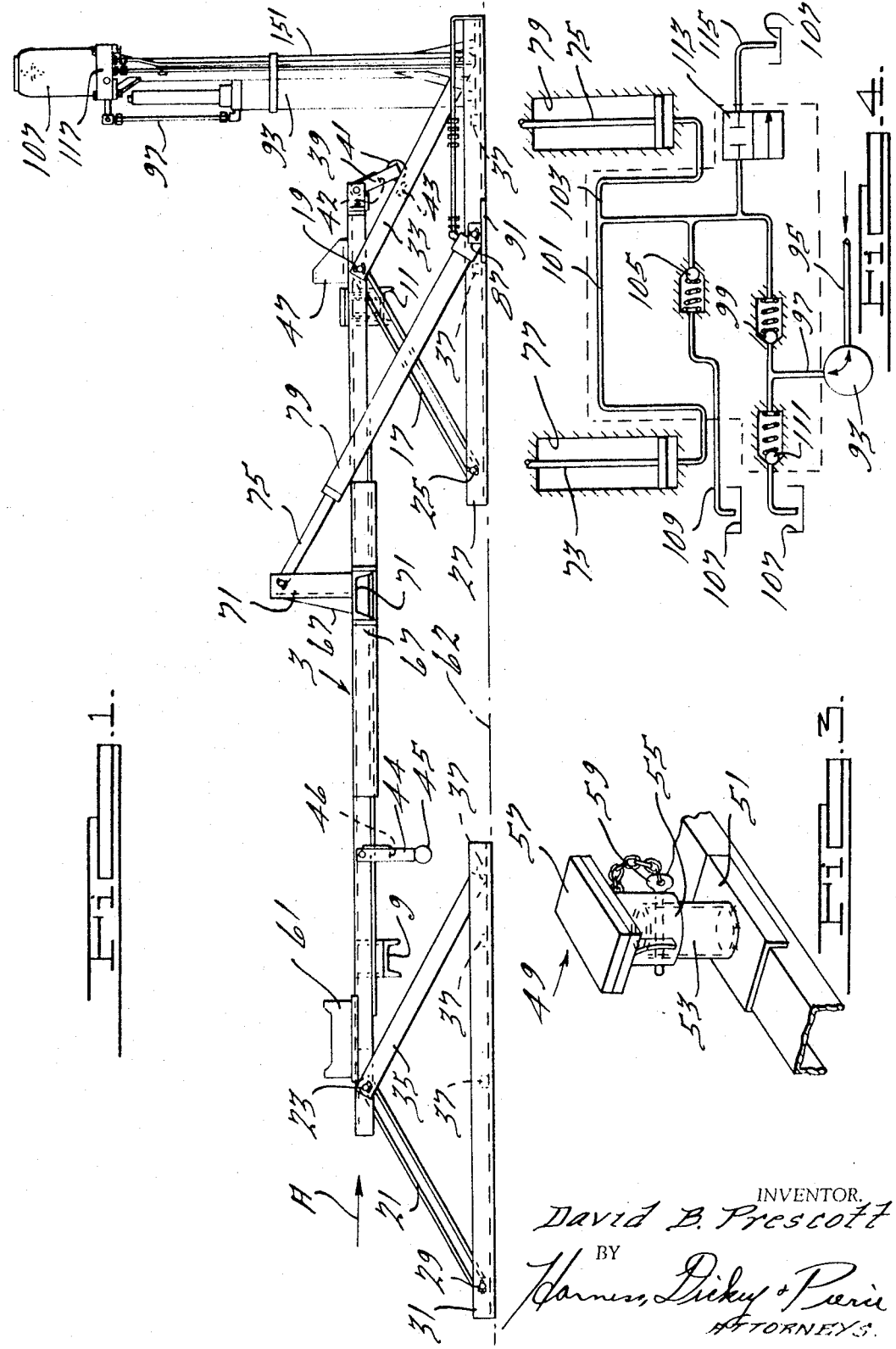
INVENTOR.
David B. Prescott
BY
Harness, Dickey & Pierce
ATTORNEYS

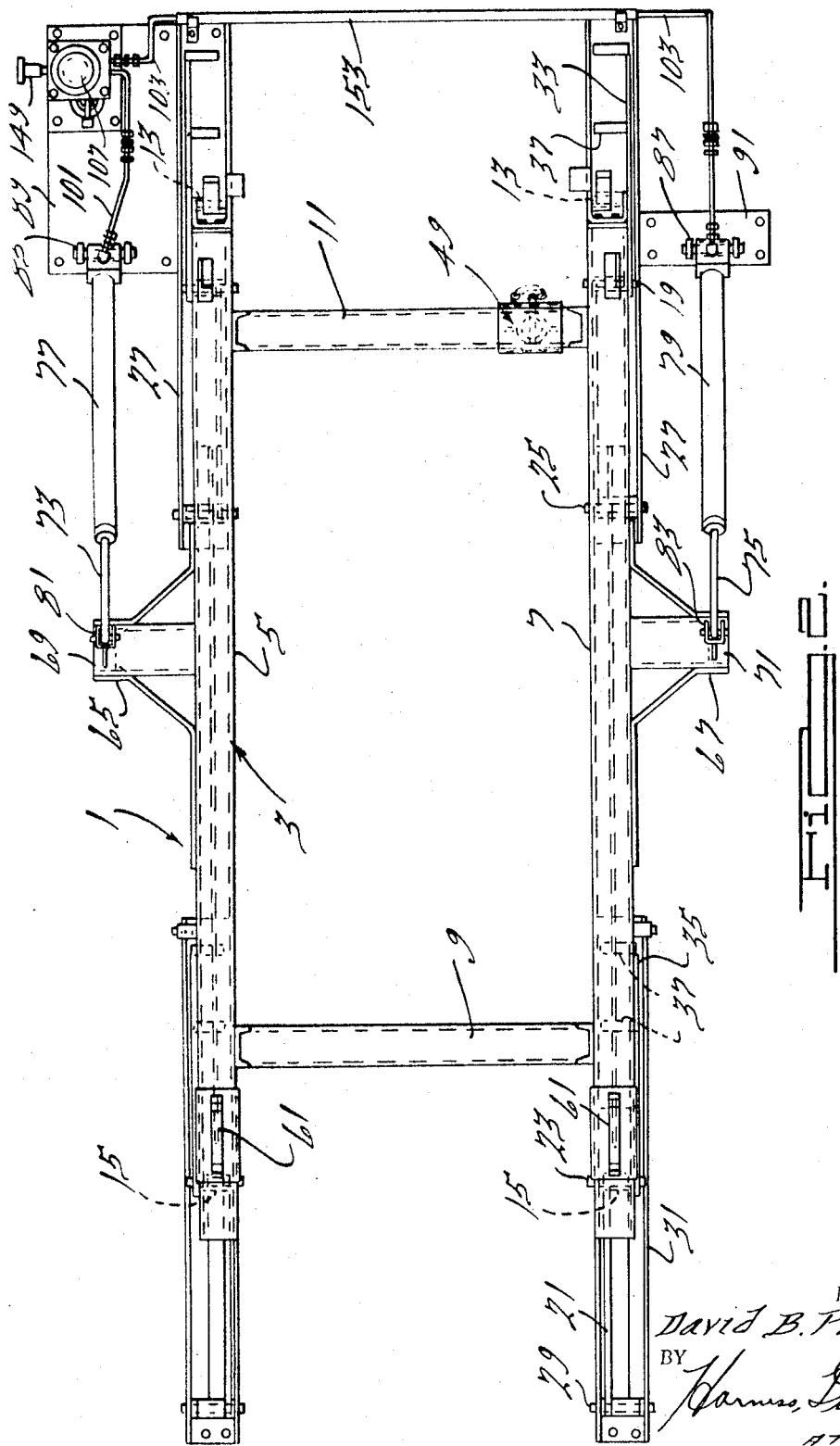

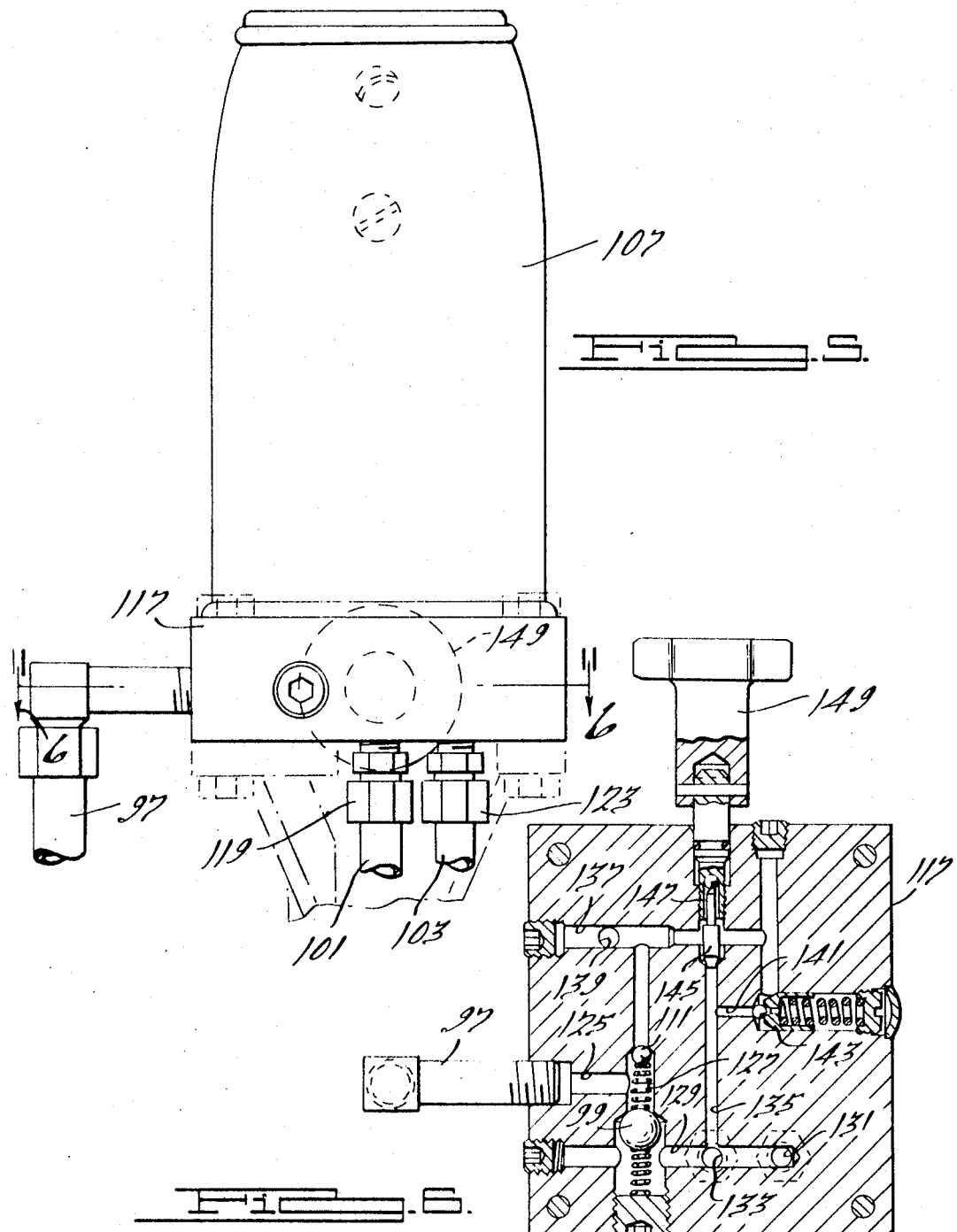

United States Patent Office 3,463,272
Patented Aug. 26, 1969

3,463,272
SMALL VEHICLE LIFT
David B. Prescott, Racine, Wis., assignor to Walker Manufacturing Company, Racine, Wis., a corporation of Delaware
Filed Nov. 9, 1967, Ser. No. 681,742
Int. Cl. B60s *13/00;* B66f *7/00*
U.S. Cl. 187—8.72   5 Claims

ABSTRACT OF THE DISCLOSURE

A relatively inexpensive lift for small vehicles, such as three wheeled trucks, is provided which is composed of a frame elevated by a pair of single acting cylinders in conjunction with a parallelogram linkage, the unit including safety features to prevent undesired lowering of the frame and a hydraulic arrangement to permit the cylinders to be operated by an air-hydraulic mechanism available on the open market such as disclosed in U.S. Patent No. 3,218,980.

BRIEF SUMMARY OF THE INVENTION

Most lifts for automobiles that are available today are relatively large and expensive since they are intended primarily to elevate full sized American automobiles. However, there are large numbers of small sized vehicles, even including the three wheeled trucks used by the U.S. Postal Department, which require servicing and can be serviced by mechanics who do not wish to make the investment required for a full size lift.

It is the purpose of this invention to provide a simple and inexpensive lift construction that may be actuated by air pressure normally found in each repair shop and one which takes up a minimum of space during use as well as during periods of inactivity. To accomplish this, the invention has a lift frame composed of standard structural parts and it is raised and lowered above simple base members by means of links. Safety arms are engageable with fixed blocks to hold the frame in elevated position. A pair of single acting hydraulic cylinders is used to pivot the frame on its links and these are actuated by a single air hydraulic pump mechanism which acts through a valve plate to supply pressure fluid to both cylinders.

DESCRIPTION OF THE DRAWINGS

FIGURE 1 is a side elevation of a lifting mechanism according to this invention;
FIGURE 2 is a plan view of FIGURE 1;
FIGURE 3 is a detailed perspective view of a lift pad which may be used with the front end of the lift;
FIGURE 4 is a schematic hydraulic circuit arrangement;
FIGURE 5 is a side elevation of the oil tank and valve plate that may be used; and
FIGURE 6 is a section along the line 6-6 of FIGURE 5.

DESCRIPTION OF THE INVENTION

The lift mechanism 1 has a main frame 3 that includes longitudinal frame members 5 and 7 which may comprise standard structural channels and be cross braced by standard structural channels 9 and 11. Adjacent the front ends the channels 5 and 7 carry pivot pin journals 13 and adjacent the rear ends pivot pin journals 15. A pair of links 17 are connected by pivot pins 19 to the front end journals 13 and a pair of links 21 are connected by pivot pins 23 to the rear end journals 15. The links 17 and 21 extend substantially parallel to each other and the bottom ends of the links 17 are journaled at 25 adjacent the rear ends of support channels 27 and the links 21 are journaled at 29 adjacent the rear ends of support channels 31. Also pivoted on the pins 19 are safety struts 33 and on the pivot pins 23 the safety struts 35. The struts 33 and 35 extend substantially parallel to each other and have free ends which can engage the rear vertical faces of blocks 37 that are secured inside the channel shaped support members 27 and 31. It is apparent from FIGURE 1 that the struts 33 and 35 by engagement with the rear faces of the blocks 37 can act as a ratchet mechanism to hold the frame 3 in elevated position. Hangers 39 are pivoted at the front end of the channels 5 and 7 and have round lateral end projections 41 that slide on rails 27 and catch surfaces 42 for engagement with the ears 43 on the struts 33 so that the struts can be held by the hangers 39 in elevated position when it is desired to lower the frame 3. Similarly, pivoted hangers 44 on the rails 5 and 7 have rounded lateral projections 45 that slide on rails 31 and catch surfaces 46 on which the rear struts 35 can be supported out of operative engagement with the blocks 37. The hangers 39 and 44 have a lateral component to their swing, permitting disengagement from the struts 33 and 35.

It is apparent that the parallelogram links 17 and 21 enable the frame 3 to remain horizontal as it is raised and lowered. Also, they permit the frame to be lowered to a very low and compact arrangement wherein the frame 3 rests on the bottom faces of the cross members 9 and 11 as the hangers 39 and 43 pivot up out of the way.

In the lowered position a vehicle can be driven over the frame in the direction of the arrow A in FIGURE 1. Blocks 47 attached to the front ends of the members 5 and 7 position the forward end of the vehicle. Adjacent the forward-most position, a single lift pad device 49 (not shown in FIG. 1) is mounted by means of its support channel 51 that can be moved transversely with respect to the members 5 and 7 by sliding along the top of the strut 11. The device 49 includes a post 53 on which is swivally mounted a cylinder 55 which projects from the bottom of the padded surface plate 57. A pin 59 projects through holes in the cylinder 55 and the post 53 to angularly position the pad 57 as well as to provide means to adjust its height. The lift pad assembly 49 can therefore be brought into engagement with the desired part of the bottom of the vehicle when the frame 3 is elevated the proper amount.

At the rear end of the frame 3 is a pair of channel mounted lift pads 61 which can slide back and forth on the tops of the members 5 and 7 and engage desired parts adjacent the rear of the bottom side of a vehicle to be lifted.

The floor members 27 and 31 are bolted directly to the floor of the building or to a suitable floor plate so that forces of the lift pass into the floor or plate. It is noted that while the members 27 and 31 are continuous in the sense of force transmittal, they are physically discontinuous and longitudinally separated. The space 62 between them permits a mechanic to roll under the lift on a "creeper."

Extending transversely out from the outer side faces of frame members 5 and 7, at a centrally located point, are brackets 65 and 67 and these include adjacent their outer ends the upright posts 69 and 71. The free ends of piston rods 73 and 75 of the hydraulic cylinders 77 and 79 are pivoted in yokes 81 and 83 on the top of the posts 69 and 71. The lower ends of the cylinders 77 and 79 are pivoted on blocks 85 and 87 which are mounted on base plates 89 and 91 secured to channels 27 and which may also be bolted to the floor.

It is apparent that by furnishing pressure fluid through the lower ends of the single acting cylinders 77 and 79 that the rods 73 and 75 will be forced outwardly and thereby act through the posts 69 and 71 and brackets 65 and 67 to lift the frame 3 to the desired height. Conversely, when the safety struts 33 and 35 are suspended on hangers 39 and 43, release of pressure from the cylinders 77 and 79 will enable the frame 3 to be lowered.

Preferably, the cylinders 77 and 79 are supplied with pressure fluid by an air actuated hydraulic cylinder such as disclosed and claimed in U.S. Patent No. 3,218,980, which is available on the open market. As schematically illustrated in FIGURE 4, such a device 93 will receive standard pressurized shop air through a conduit 95 and pump hydraulic fluid to a passage 97 to unseat check valve 99 and flow through passages 101 and 103 to the hydraulic cylinders 77 and 79. A relief valve 105 prevents excessive pressure build up by unseating to permit fluid to flow to the reservoir 107 through the passage 109. On the suction stroke oil is taken from the reservoir 107 past the check valve 111 to the pump cylinder so that on the compression stroke, it can be passed by the check valve 99 to the cylinders. A manual-release valve 113 can be actuated to release pressure at a desired rate in the lines 101 and 103 and permit it to flow through passage 115 to the reservoir 107 and thereby control lowering of the lift 3. No attempt is made to hydraulically synchronize single acting cylinders 77 and 79. The required synchronization is provided by the basic rigidity of the frame 3.

Referring more specifically to the structure of FIGURES 5 and 6, an oil tank or reservoir 107 is mounted on top of a valve plate 117 (shown in outline by dotted lines in FIG. 4) which has outlet fittings 119 and 123 for attachment to the lines 101 and 103. The block 117 has a passage 125 that receives oil pressure from the line 97 at the pump outlet end of the air hydraulic unit 93. The passage 125 opens into the passage 127 which contains the ball check valve 99 and 111. Oil flowing by the check valve 99 under pressure enters passage 129 from which it can flow through passages 131 and 133 respectively to the pressure lines 101 and 103. A passage 135 in the block 117 connects the pressure passage 129 with a reservoir passage 137, the latter intersecting a passage 139 that opens into the bottom of tank reservoir 107. Intersecting the passage 135 is a relief passage 141 which is normally closed by a pressure relief valve mechanism 143 which will open at a specified pressure to permit oil to flow to the reservoir passage 139 thereby relieving pressure in passage 129.

A conical valve plunger 145 fits in the end of passage 135 and is positioned by screw type stem assembly 147 which is manually rotated by the hand knob 149. It is apparent that manipulation of the knob 149 will regulate the degree of unseating of the valve 145 and thus the release of pressure in passage 139 to control the rate of descent of the frame 3. The tank 107 and valve plate 117 may be mounted on a pedestal structure 151 which in turn can be supported on the plate 89. Since this is located at one side of the frame 3, the pressure conduit 103 must pass across the front end of the frame 3. In order to protect it a cover channel 153 is attached to the front ends of the longitudinal members 5 and 7 to cover the top of the conduit.

It is now apparent that a simple but reliable and useful lift mechanism of a safe, readily operated design has been provided and that it may be pressure fluid operated by means of a mechanism which is available at low cost.

Modifications may be made without departing from the spirit and scope of the invention.

I claim:
1. A vehicle lift comprising a rectangular frame including movable pads for engaging the bottom side of a vehicle to be lifted, a support means adapted to lie on a floor where the lift is to be used and including separated front and rear sections with a free space between them, parallelogram linkage connecting the front and rear of the frame to respectively the front and rear support means sections and guiding vertical movement of the frame relative to the support means, parallelogram safety struts pivoted to the frame and having free ends, said support means front and rear sections having fixed blocks engageable by said free ends of the struts to hold the frame in elevated position above the support means, hanger means on the frame engageable by the struts to selectively hold them away from said blocks when it is desired to lower the frame to a position of minimum elevation, brackets extending transversely outwardly from opposite sides of the frame, a pair of fluid pressure cylinders located outside the frame and connected respectively to said brackets for supplying force to elevate the frame, and fluid pressure control means for controlling flow of fluid pressure to and from the cylinders.

2. A lift as set forth in claim 1 wherein said frame comprises longitudinal and transverse downwardly facing channel bars and said support means comprises upwardly facing channel bars, said blocks being secured inside the upwardly facing channel bars forming said support means.

3. A lift as set forth in claim 1 wherein said transverse brackets having upstanding posts thereon, said cylinders having piston rods pivoted to said posts, said support means including base plates adjacent the front end of the frame and located on opposite sides of the frame and outside the frame, said cylinders being pivoted respectively to the base plates, said control means being mounted on one of said base plates.

4. A lift as set forth in claim 3 including a single pumping source of hydraulic pressure for pumping fluid to said control means, said control means including a manually operated valve for releasing pressure on the cylinders at a selected rate to provide for descent of the frame, said control means also including a valve plate supported on said base plate and having flow passages and valving therein, an oil reservoir mounted on top of said valve plate, said valve plate having connections to said pumping source and to said cylinders and including said release valve.

5. A vehicle lift as set forth in claim 1 including common pivots securing the upper ends of the parallelogram linkage and safety struts to said frame.

References Cited
UNITED STATES PATENTS

| | | | |
|---|---|---|---|
| 2,456,646 | 12/1948 | Patterson | 187—8.49 |
| 2,790,683 | 4/1957 | Clark | 187—8.72 |
| 3,317,004 | 5/1967 | Harrison | 187—8.72 |
| 3,395,777 | 8/1968 | Rodosta | 187—8.59 |

EVON C. BLUNK, Primary Examiner

HARVEY C. HORNSBY, Assistant Examiner

U.S. Cl. X.R.

91—413; 187—8.5